(12) United States Patent
Goss et al.

(10) Patent No.: US 7,324,535 B1
(45) Date of Patent: Jan. 29, 2008

(54) METHODS AND APPARATUS FOR MAINTAINING A QUEUE

(75) Inventors: Gregory S. Goss, Dunstable, MA (US); Andrew T. Hebb, Harvard, MA (US); Albert A. Slane, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 970 days.

(21) Appl. No.: 10/411,172

(22) Filed: Apr. 10, 2003

(51) Int. Cl.
*H04L 12/26* (2006.01)
*H04J 1/16* (2006.01)
*G08C 15/00* (2006.01)
*G06F 11/00* (2006.01)

(52) U.S. Cl. .................. 370/411; 370/230; 370/235

(58) Field of Classification Search ........ 370/229–235, 370/412–429; 709/201–224, 232–235
See application file for complete search history.

(56) References Cited

U.S. PATENT DOCUMENTS

| | | | | |
|---|---|---|---|---|
| 5,115,429 A * | 5/1992 | Hluchyj et al. | ............ | 370/231 |
| 5,426,640 A * | 6/1995 | Hluchyj et al. | ............ | 370/235 |
| 6,128,642 A * | 10/2000 | Doraswamy et al. | ....... | 709/201 |
| 6,226,267 B1 | 5/2001 | Spinney et al. | ............ | 370/235 |
| 6,426,943 B1 | 7/2002 | Spinney et al. | ............ | 370/235 |
| 6,430,184 B1 | 8/2002 | Robins et al. | ............ | 370/392 |
| 6,522,188 B1 | 2/2003 | Poole | .................. | 327/407 |
| 6,625,161 B1 * | 9/2003 | Su et al. | ................ | 370/415 |
| 6,714,553 B1 | 3/2004 | Poole et al. | ............... | 370/412 |
| 6,721,796 B1 * | 4/2004 | Wong | ...................... | 709/232 |
| 6,829,224 B1 * | 12/2004 | Goldman et al. | ........... | 370/252 |
| 6,856,596 B2 * | 2/2005 | Blumer et al. | ............. | 370/230 |
| 6,990,113 B1 * | 1/2006 | Wang et al. | ................ | 370/412 |
| 6,996,062 B1 * | 2/2006 | Freed et al. | ................ | 370/235 |
| 2003/0112814 A1 * | 6/2003 | Modali et al. | ............. | 370/412 |
| 2004/0042397 A1 * | 3/2004 | Chang et al. | .............. | 370/230 |
| 2004/0218617 A1 * | 11/2004 | Sagfors | .................... | 370/412 |
| 2006/0045011 A1 * | 3/2006 | Aghvami et al. | ........... | 370/230 |

OTHER PUBLICATIONS

Pentikousis, Kostas; Connector, "Active Queue Management;" retrieved from Internet (www.acm.org/crossroads/columns/connector/july2001.htm) Jul. 10, 2007; 6 pages.

* cited by examiner

*Primary Examiner*—Man U. Phan
(74) *Attorney, Agent, or Firm*—BainwoodHaung

(57) ABSTRACT

Typically, queues in a router device are used to track data information such as packets or data flows for later transmission to another downstream communication device. To reduce overhead associated with tracking an average queue length of a queue, a metric reflecting average queue length (or estimated queue length) is updated based on the occurrence of an event such as when the contents of the queue are modified. More specifically, if data is added or deleted from the queue, the metric reflecting an average fullness of the queue over time is updated at substantially the same time as updating the instantaneous queue length metric associated with the queue. This technique of synchronously updating both IQL and AQL simplifies the overall task of maintaining queue length information.

22 Claims, 9 Drawing Sheets

METHODS AND APPARATUS FOR MAINTAINING A QUEUE

BACKGROUND OF THE INVENTION

Random Early Detection (RED) is an algorithm for avoiding congestion in routers. It works on the assumption that a majority of traffic passing through a router comprises TCP (Transport Control Protocol) data packets sent from multiple users simultaneously sharing network resources.

According to TCP standards, a user transmits data packets to a destination node during an initial time window without receiving an acknowledgment. Typically, the size of the time window is increased in order to transmit data at successively higher rates. When experiencing congestion, a user will eventually receive feedback indicating that certain data packets generated during the TCP session have been dropped. In response to sensing dropped packets, TCP sessions reduce their window size and thus reduce their rate of sending traffic. This technique of adjusting a time window allows each user to transmit data at a corresponding peak data transfer rate.

Synchronization of many TCP sessions that increase their rate of transmitting data without receiving negative feedback (loss of data) can result in tremendous network congestion and lost data. This situation occurs when multiple users running separate TCP sessions simultaneously increase their rate of sending data.

To avoid this type of congestion, RED algorithms employ a technique of tracking an average queue length associated with a data queue in the router. Tracking of an average queue length metric allows the router to absorb short-term periods of congestion. For example, rather than allowing the queue to fill to its absolute capacity before dropping incoming data, RED randomly drops data packets according to a specified probability chart when the average queue length of data in the queue exceeds a threshold value indicating that the queue is quite full. Randomly dropping data packets in the flows at different times breaks the synchronization behavior.

The average queue length (AQL) metric associated with a queue has been tracked based on exponential weighted averaging of the instantaneous length of a queue, which indicates a relative fullness of the queue at a particular instant in time. For example, an exponentially weighted portion of the instantaneous queue length (IQL) metric is added to a previous AQL metric to produce a newly updated AQL metric. One conventional method of tracking queues specifically involves periodically updating an AQL metric of the queue at equally spaced intervals of time, while asynchronously updating an instantaneous queue length (IQL) metric associated with the queue at times when its contents are modified.

SUMMARY

Unfortunately, there are deficiencies associated with the aforementioned approach of maintaining a queue based on periodic updating of the average queue length information. For example, the use of conventional techniques to track an average queue length incurs excess overhead such as additional circuitry and processing time to track whether a queue is too full to accept and store any new data.

More specifically, even though conventional techniques for tracking queue length information may be effective, the actual implementation of techniques may be impractical or burdensome because they employ two separate functions to update IQL (Instantaneous Queue Length) and AQL (Average Queue Length) metrics associated with the queue. A first task involves periodically generating an updated AQL metric at equally spaced time intervals. The second task involves sporadically updating the instantaneous queue length whenever data is added or deleted from the queue.

Another reason that conventional techniques are impractical is the overhead associated with accessing memory at different times. In WRED (Weighted Random Early Detection) applications, an EWMA (Exponential Weighted Moving Average) queue length metric is updated as a background task separate from updating an associated IQL metric as discussed above. The time associated with accessing memory can be substantial when the AQL and IQL metric are updated at separate times. Such overhead is particularly burdensome when queue length metrics are tracked for each of thousands, tens of thousands, or even millions of queues.

One aspect of the present invention involves tracking queue length information in, for example, a data communications device. Typically, queues in such devices store data information such as packets or data flows for later transmission to other downstream communication devices. To reduce overhead associated with tracking an average queue length of a given queue, a metric reflecting average queue length (or estimated queue length) is updated based on the occurrence of an event such as modification of contents in a queue. For example, if data is added or deleted from the queue, the metric reflecting an average fullness of the queue over time is updated at substantially the same time as updating the instantaneous queue length metric associated with the queue. This technique of synchronously updating both IQL and AQL metrics around the time of modifying the queue simplifies the overall task of maintaining queue length information.

A running-average queue length metric (e.g., a time averaged queue length metric) tracking an historical fullness of the queue over time is updated depending on an amount of elapsed time since a previous update of queue length information. For example, a present running-average queue length metric of the queue is calculated based on a previously calculated running-average queue length (AQL) metric, an instantaneous queue length (IQL) metric and the elapsed time since a previous update of queue length information.

The running-average queue length metric is incrementally updated each time the queue is modified. For example, the running-average queue length metric is determined by adding a portion (such as an exponentially weighted portion) of the previously calculated running average queue length metric and a portion of the instantaneous queue length of the queue at a particular instant in time. For longer elapsed time between AQL updates, a greater exponentially weighted portion of the present instantaneous queue length is added to a previous AQL metric to produce the running-average queue length metric. Conversely, for shorter elapsed time between AQL updates, a smaller exponentially weighted portion of the present instantaneous queue length is used to produce the updated running average queue length metric. This technique of proportionally or exponentially weighting the instantaneous queue length metric tempers or filters changes in the average queue length metric so that quick data bursts (such as sporadic receipt of many data packets) received in a relatively short duration of time do not cause the average queue length metric to change too quickly. When the queue is modified less frequently (greater elapsed time between updates), the running average queue length metric is set more closely equal to the instantaneous queue length value because the latter metric is more representative of the state of the queue.

In one application, a signal is generated to indicate modification of the queue. Such a signal can be generated as a result of adding data to or deleting data from the queue. In response to receiving the signal, a processing device first updates the instantaneous queue length metric associated with the queue. That is, the IQL metric is updated to reflect an amount of data in the queue as a result of the modification. At substantially the same time as updating the IQL metric, the processing device also updates the average queue length metric associated with the queue. Consequently, updating the average queue length metric is event-driven in which the event is modification of the queue itself.

The average queue length metric can be used for making decisions. For example, the data communications device can receive data packets that are presented for storage in the queue. Before storing a newly received data packet in the queue, the updated average queue length metric is compared to one or more thresholds to determine the fate of the new data packet. If the queue is too full as indicated by the running average queue length metric, the packet may be discarded based on a probability function. For example, if the running average queue length value falls between a minimum and maximum threshold, the packets can be randomly dropped (based on the probability function) depending how close the value of the average queue length metric is to the threshold. Conversely, if the queue is relatively empty as indicated by the running average queue length metric, the packet may be stored in the queue. In this way, the queue is maintained for efficient storage of data.

As previously discussed, incrementally updating the running average queue length metric ensures that it tracks an historical fullness of the queue. Incremental changes in the running average queue length are weighted depending on an amount of elapsed time since a previous update of the running average queue length metric. This technique of weighting eliminates the need for updating the AQL metric at periodic intervals.

One technique for determining the amount of elapsed time between queue length information updates is to store time stamp information associated with each update of the average queue length metric. The processing device updating the average queue length metric can determine the amount of elapsed time between updates by comparing the present time of a new AQL update with that of a previous AQL update stored in memory.

Based on the amount of elapsed time since a previous update, a weight factor (such as an exponential weight factor) is generated. This weight factor is then used to produce the updated AQL metric (such as a time-averaged queue length metric) associated with the queue by multiplying the weight factor by the updated instantaneous queue length metric.

In one application, the following equation is used to calculate and update the AQL metric:

$$\text{updated AQL} = w(\text{present IQL}) + (1-w)(\text{previous AQL}),$$

where w is a weight factor that varies depending on an elapsed time since a previous AQL update. Generally, the weight factor, w, varies between 0 and 1 so that the newly updated AQL metric is equal to a portion of the previously updated AQL and a portion of the present IQL metric.

It is sometimes desirable to adjust the AQL metric so that it is never larger than a corresponding IQL metric. For example, when data is repeatedly deleted from a previously full queue, a calculated value of the present AQL may become larger than the present IQL metric. In this instance, a processing device sets the AQL metric equal to the present IQL metric. This ensures that the AQL metric more closely reflects that the queue is actually empty and can be used to store new data. During times of intense data bursts when the queue is being filled, a value of the average queue length metric may appear to lag behind the actual instantaneous queue length metric. This technique of tracking average queue lengths is desirable because bursts of data are usually only temporary.

The aforementioned techniques of tracking queue length information associated with one or multiple queues is preferable over the use of conventional techniques. Managing even a single queue can be difficult when the inflow of data into the queue exceeds its output capability. In certain applications, thousands of queues are managed, thus rendering it a difficult task to maintain all the queues at the same time. As a result of limited throughput of each queue, certain data intended for storage in the queue must be discarded at the dismay of a user trying to transmit a data packet through the queue to an intended target. According to the invention, an economical and efficient use of memory enables the queue length metric tracking system to perform much faster. Thus, hardware and/or software resources previously employed to manage queue length information for one or multiple queues can instead be used for other purposes such as actual transmission or transfer of the data so that the communications device supports a higher throughput.

DETAILED DESCRIPTION

Networking devices such as routers sometimes implement thousands of data queues to temporarily store data packets for later transmission to an intended target. As a result of ever-increasing demand for bandwidth (e.g., Internet access) and simultaneous sharing of routers, such queues can be inundated with an inflow of data packets. It has been learned that without proper regulation of managing the inflow of data into the queue, both queue efficiency and overall network efficiency can suffer tremendously.

One aspect of the present invention is maintenance of a storage device such as a data queue. Because the capacity of a queue is typically limited, metrics such as queue length information (indicating relative fullness of the queue) are tracked in order to more efficiently regulate an inflow of new data stored in a queue. Although the techniques described herein can be used in networking applications, and particularly to enqueueing and dequeueing of data, the techniques are also well-suited for other applications that employ queues to temporarily store data information.

According to the principles of the present invention, two queue length metrics are tracked to regulate a flow of new data into a queue. The first metric is Instantaneous Queue Length (IQL), which represents a relative fullness of the queue at a particular instant in time. The second metric is Average Queue Length (AQL), which represents an historical fullness of the queue over time. In general, the AQL metric associated with a queue is incrementally updated to a new value by adding an exponentially weighted portion of a previously calculated AQL and an exponentially weighted portion of the present IQL metric. For longer amounts of elapsed time between AQL updates, a greater proportion (exponentially weighted portion) of the present instantaneous queue length is used to produce the running average queue length. Conversely, for shorter amounts of elapsed time between AQL updates, a smaller proportion (exponentially weighted portion) of the present instantaneous queue length is used to produce the updated running average queue length. In one application, AQL is updated when contents of the queue are modified.

Figure 1:
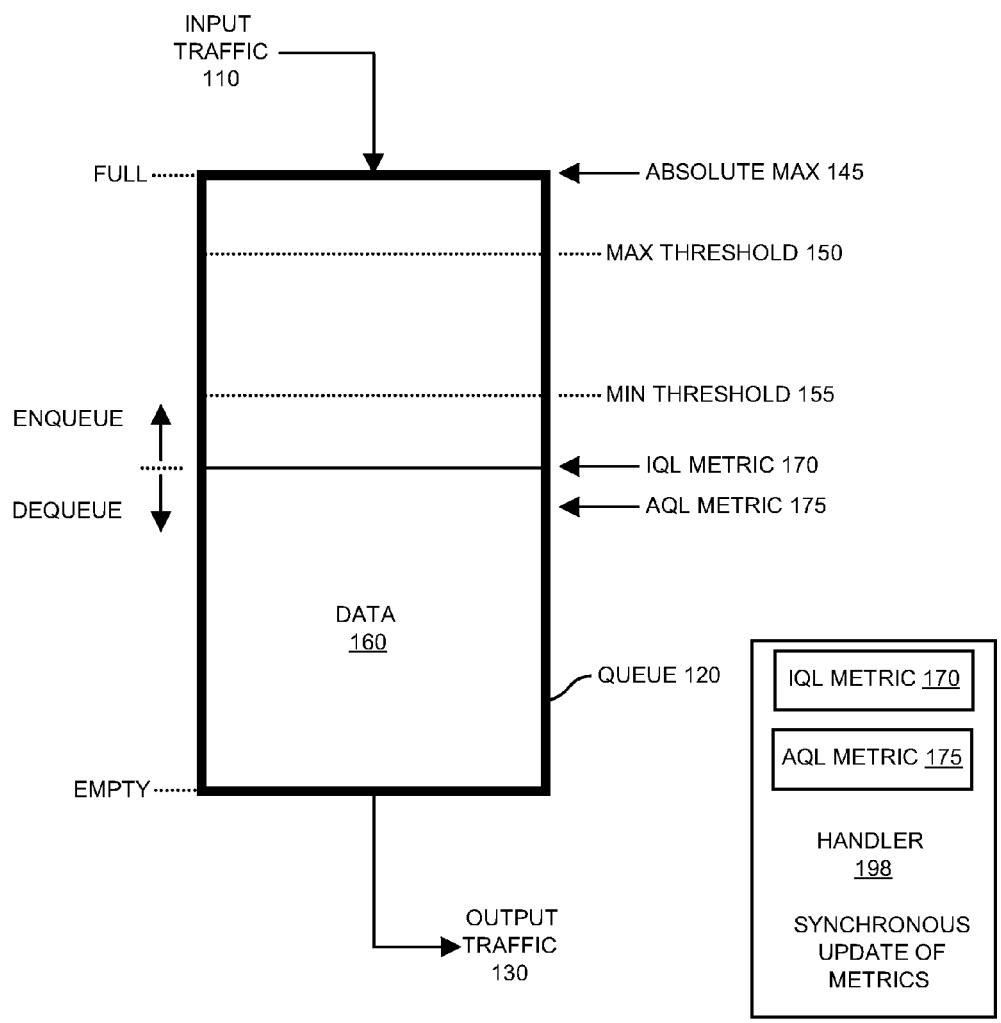
FIG. 1 is a block diagram illustrating a queue and a corresponding inflow and outflow of data.

FIG. 1 is a block diagram of queue 120 for managing data flows according to certain principles of the present invention. As shown, input traffic 110 is temporarily stored in queue 120 as data 160. Output traffic 130 represents data 160 that has been removed or deleted from queue 120 as a result of sending it to a target. An amount of input traffic 110 is regulated by handler 198 so that queue 120 supports an efficient flow of data traffic through queue 120.

IQL metric 170 identifies the length of the queue at a particular instant in time. When data is added to queue 120, IQL metric 170 is proportionally increased to reflect enqueuing such data. When data is removed or deleted from queue 120, IQL metric 170 is proportionally decreased to reflect dequeueing of data 160.

AQL metric 175 tracks an historical fullness of queue 120 overtime. In the instance shown, AQL metric 175 is less than IQL metric 170. This indicates that IQL metric 170 was previously less than its present value and that it recently increased as a result of storing additional data 160 to queue 120.

In general, the queue length information (e.g., IQL metric 170 and AQL metric 175) is used to regulate an amount of input traffic 110. Without the regulation of input traffic 110, queue 120 can overfill due to the TCP synchronization effect (as discussed) causing congestion in queue 120 and network inefficiency. By regulating queue 120 (dropping input traffic 110 in response to sensing the queue is getting full or quickly becoming full), multiple users storing data in queue 120 can get a sense that their corresponding rate of sending or storing traffic in queue 120 should be reduced (or not increased). Without regulating how much input traffic 110 is stored in queue 120, it will be overfilled and much of the data will be discarded requiring it to be resent and leading to increased synchronization of the traffic streams. This technique of regulating input traffic 110 reduces the overall amount of data that needs to be retransmitted and thus increases network efficiency.

Queue 120 handles bursts of input traffic 110 by regulating input traffic 110 using AQL metric 175 and IQL metric 170. More specifically, if IQL metric indicates that queue 120 is full or equal to absolute maximum threshold 145, any new data from input traffic 120 must be discarded. If queue 120 is not absolutely full, AQL metric 175 is used to determine whether to store newly received input traffic 110 in queue 120. For example, input traffic 110 such as network data packets are stored in queue 120 depending on a relative value of AQL metric 175 in relation to minimum threshold 155, maximum threshold 150 and absolute maximum threshold 145.

In one application, queue 120 resides in a data communications device that routes or temporarily stores data information such as data packets. One purpose of queue 120 is to buffer data packets for later transmission to a target destination.

Figure 2:
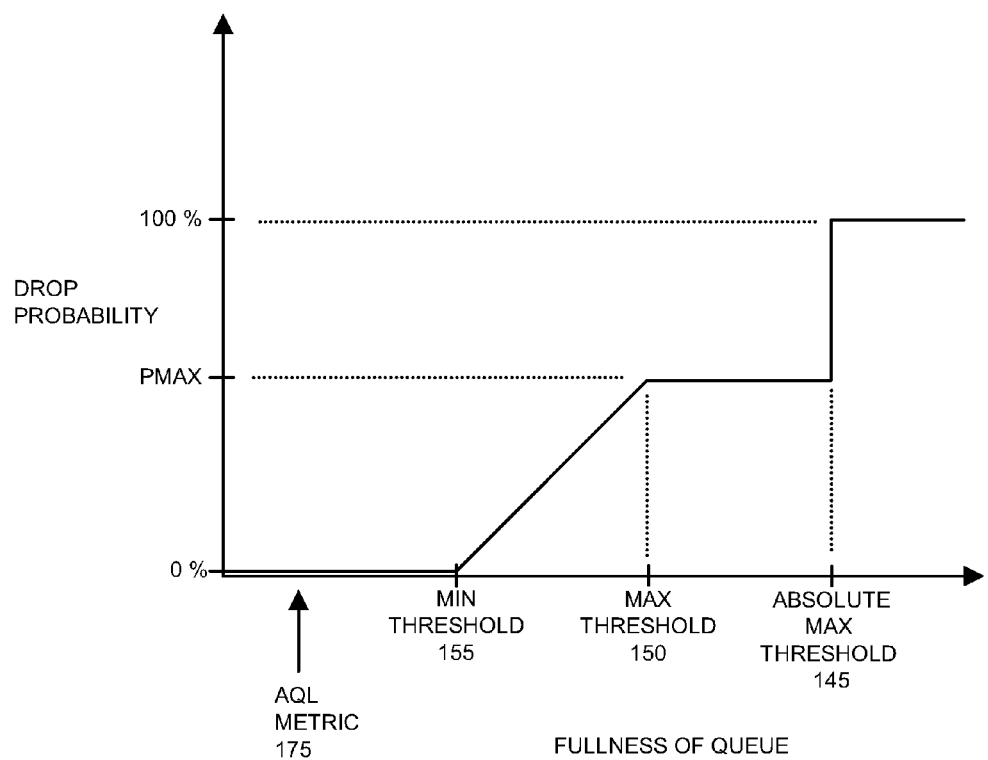
FIG. 2 is a graph illustrating a probability of dropping a newly received packet depending on fullness of a queue.

FIG. 2 is a graph illustrating a probability of dropping input traffic 110 depending on fullness of queue 120. As shown, the present value of AQL metric 175 is less than minimum threshold 155. In this instance, input traffic 110 is stored in queue 120 because there is a 0% probability of dropping data.

When AQL metric 175 falls between minimum threshold 155 and maximum threshold 150, the probability of dropping input traffic 110 increases linearly as AQL metric 175 increases to a maximum amount Pmax.

A maximum drop probability occurs when AQL metric 175 falls between maximum threshold 150 and absolute max threshold 145. As shown, the probability of dropping input traffic 110 in such a range is Pmax. In response to dropping some amount of input traffic 110, users will discontinue ramping transmission of data information so that queue 120 is not inundated with ever-increasing amounts of input traffic 110.

Figure 3:
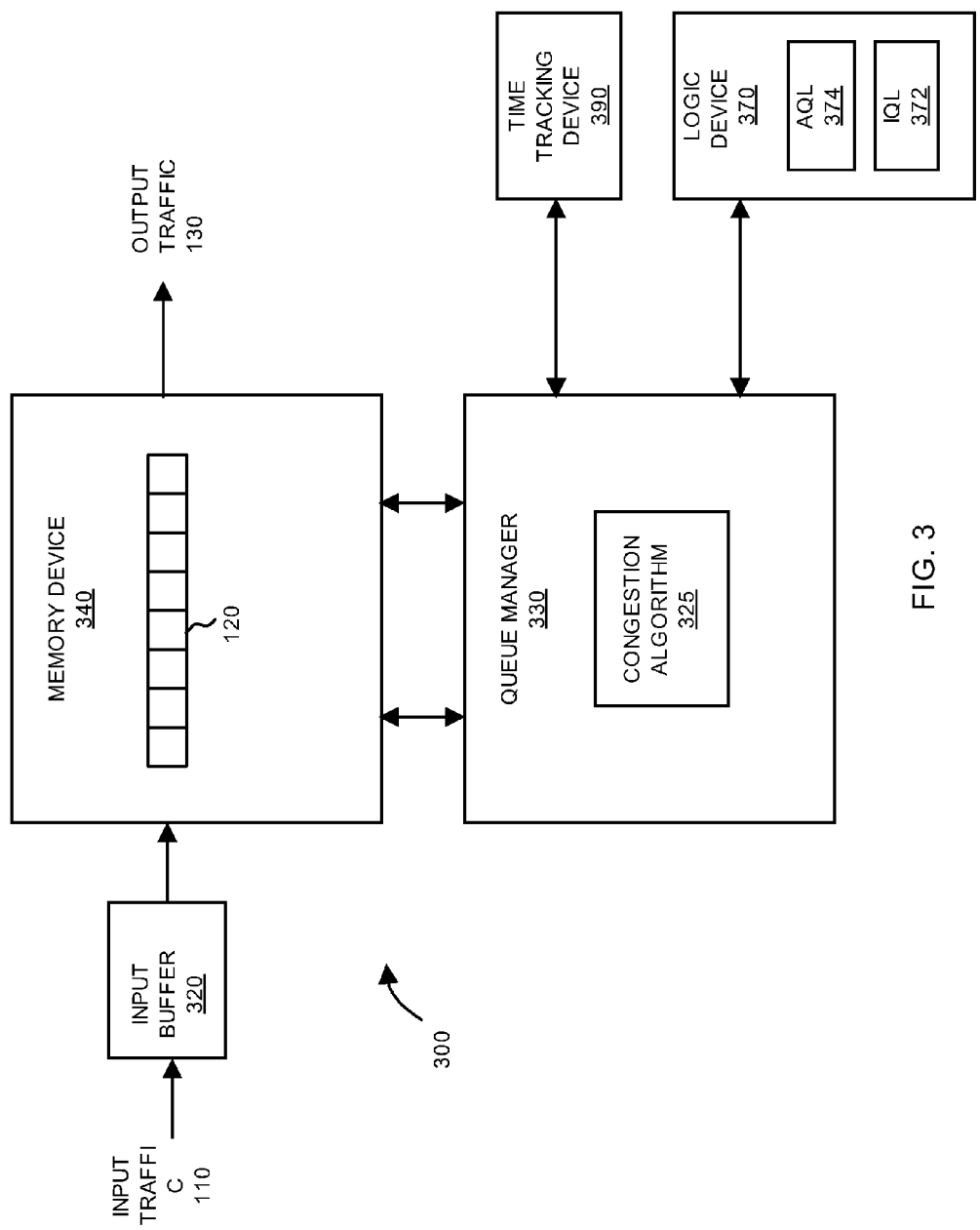
FIG. 3 is a detailed block diagram of a queue and supporting electronic circuitry.

FIG. 3 is a block diagram of output buffer 300 for tracking queue length information. As shown, buffer 300 includes input buffer 320, memory device 340, queue manager 330, time tracking device 390, and logic device 370. Logic device 370 includes AQL register 374 and IQL register 372.

Queue manager 330 regulates a flow of data information stored in memory device 340 and, more specifically, queue 120 (also see FIG. 1). Any suitable memory device such as RAM (Random Access Memory), SRAM (Static RAM), DRAM (Dynamic Random Access Memory), FIFO, registers, and combinatorial logic can be used to fabricate queue 120.

Queue manger 330 runs congestion algorithm 325 to manage a flow of input traffic 110 and output traffic 130. In one application, congestion algorithm 325 is a WRED (Weighted Random Early Detection) algorithm. Other suitable algorithms can be used.

Upon receipt of input traffic 110 such as a data packet at input buffer 320, queue manger 330 determines whether to store the data packet in queue 120. As previously discussed, this decision depends on the status of AQL metric 175 (stored in AQL register 374) and the drop probability chart in FIG. 2.

In the event that newly received data information stored in input buffer 320 is stored in queue 120, queue manager 330 generates a signal indicating modification of queue 120 and, more specifically, transfer of the data information into queue 120. Alternatively, queue manger 330 would drop or discard the data information because the queue is too full. In either case, input buffer 320 is ready to receive new data.

In response to modifying queue 120 by adding new data or transmitting previously stored data 160 as output traffic 130, logic device 370 updates metrics associated with queue 120. For example, queue manager 330 generates and transmits a signal to logic device 370 indicating that contents of queue 120 have been or will be modified. In response to receiving the 'modification' signal, logic device 370 such as a circuit disposed in an ASIC (Application Specific Integrated Circuit) or FPGA (Field Programmable Gate Array) calculates and updates corresponding registers that store queue length metrics.

IQL register 372 stores IQL metric 170. In response to the event of adding or deleting data from queue 120, IQL register 372 is updated (incremented or decremented) to reflect a new amount of data 160 stored in queue 120.

AQL register 374 stores AQL metric 175. As discussed, this metric is used to determine whether to store data in input buffer 320 into queue 120. AQL register 374 and its contents AQL metric 175 are updated in response to modifying a contents of queue 120.

In one application, AQL register 374 and IQL register 372 are each 23-bit floating point numbers including 19 bits of mantissa and 4 bits of exponent. When used, the values stored in the registers can be converted to a 36-bit integer in which the upper 20 bits are a whole part of the number and the lower 16 bits are a fractional part of the corresponding number. The upper 20 bits of the average, or whole part of the number, is used to compare against minimum threshold 155 and maximum threshold 155. The floating point number can be converted to an integer value that is used to determine whether to drop newly received input traffic.

In another application, AQL register 374 and IQL register 372 support holding multi-bit integer values that reflect a fullness of queue 120. Binary arithmetic is used to update the values at appropriate times.

Figure 4:
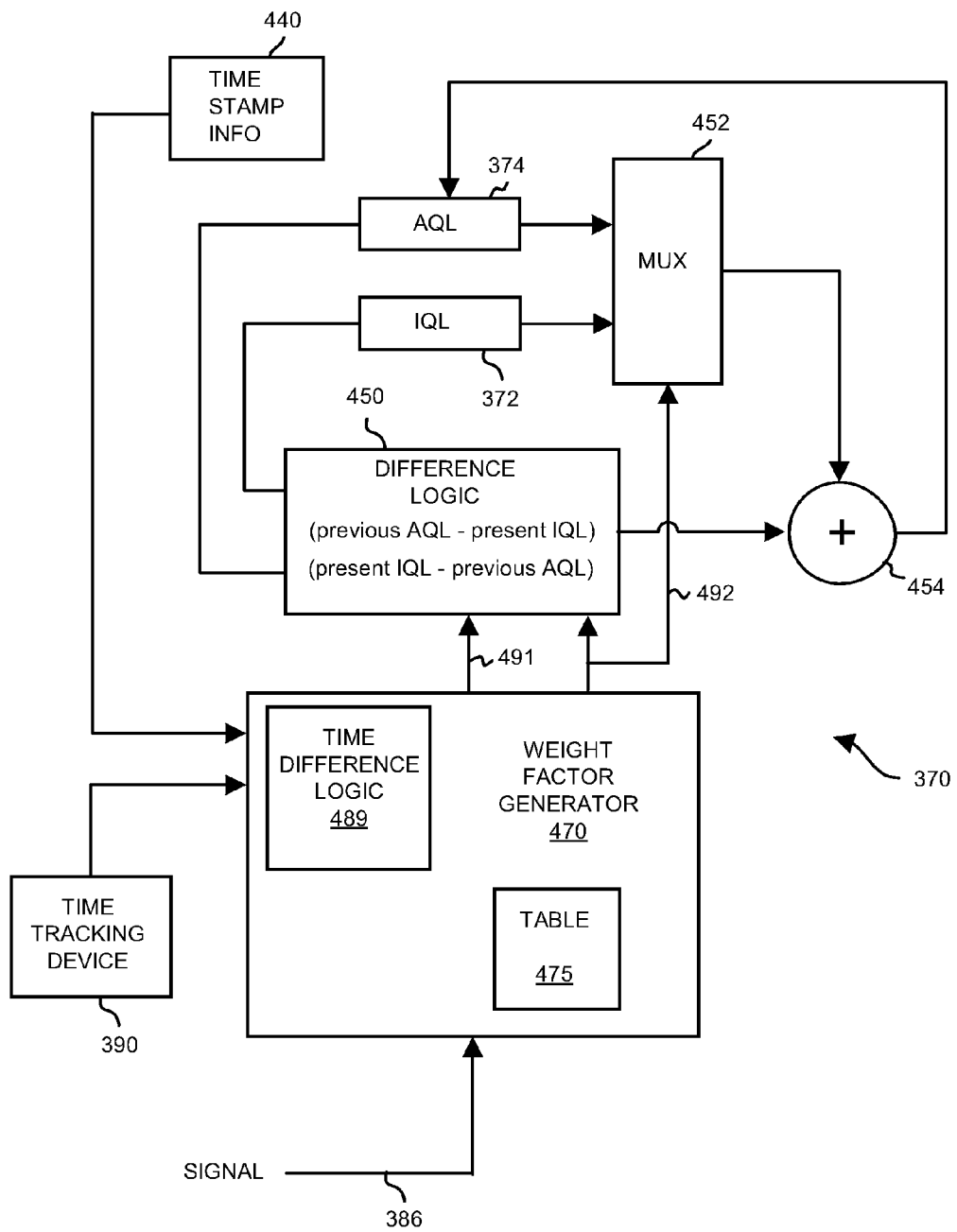
FIG. 4 is a block diagram of a logic function to track queue length metrics.

FIG. 4 is a detailed block diagram illustrating the hardware function that updates AQL register 374. Logic device 370 includes weight factor generator 470, difference logic 450, AQL register 374, IQL register 372, summer 454 (e.g., an adder circuit), multplexor 452, time stamp information 440, and shift table 475 to update AQL metric 175 in response to receiving activation signal 386. Weight factor generator 470 includes time difference logic 489 and table 489.

Upon receipt of activation signal 386 for updating queue length information from queue manager 330, logic device 370 updates IQL metric 170 and AQL metric 175. To update queue length information, logic device 370 initially calculates an amount of elapsed time since a previous AQL update. This involves comparing the present time as provided by time tracking device 390 (also see FIG. 3) with time stamp information 440 associated with a previously calculated AQL metric 175. Time stamp information 440 stores real-time clock or counter information for determining an amount of elapsed time between updating previous AQL metric 175.

During the update process, weight factor generator 470 compares the calculated amount of elapsed time since a last update with a set of ranges stored in shift table 475 (see Table 1 below). Depending on an amount of elapsed time between updates, weight factor generator 470 selects an appropriate equation to update AQL metric 170.

In general, AQL metric 175 is updated based on the following equation:

$$\text{updated AQL} = w(\text{present IQL}) + (1-w)(\text{previous AQL}) \quad [\text{eq. 1}]$$

where w is a weight factor that varies depending on an amount of elapsed time since a last AQL update. Weight factor w varies between 0 and 1 so that the newly updated value of AQL metric 175 is a portion of the previous AQL metric 175 and a portion of the presently updated IQL metric 170.

Logic device 370 generates a newly updated AQL metric 175 using binary arithmetic in hardware. However, it should be noted that any suitable arithmetic logic can be used to generate AQL metric 175.

Equation 1 above can be modified to simplify the hardware that is used to update queue length metrics. For example, equation 1 can be rewritten as:

$$\text{updated AQL} = \text{present IQL} + w(\text{previous AQL} - \text{present IQL}) \quad [\text{eq. 2}]$$

$$\text{updated AQL} = \text{previous AQL} + w(\text{present IQL} - \text{previous AQL}) \quad [\text{eq. 3}]$$

Equation 2 is used to calculate an updated AQL metric 175 when t generated by time difference logic 489 is greater than a threshold value. On the other hand, equation 3 is used to calculate an updated AQL metric 175 when t is less than a threshold value. In the instance below in Table 1, such a threshold is 32 mS (milliseconds).

TABLE 1

| Range | t Elapsed Time | w Shift Factor | Equation Number |
|---|---|---|---|
| 1 | 0-500 ns | 17 | 3 |
| 2 | .5-1 μs | 16 | 3 |
| 3 | 1-2 μs | 15 | 3 |
| 4 | 2-4 μs | 14 | 3 |
| 5 | 4-8 μs | 13 | 3 |
| 6 | 8-16 μs | 12 | 3 |
| 7 | 16-32 μs | 11 | 3 |
| 8 | 32-64 μs | 10 | 3 |
| . | . | | |
| . | . | | |
| . | . | | |
| 16 | 8-16 ms | 2 | 3 |
| 17 | 16-32 ms | 1 | 3 |
| 18 | 32-64 ms | 1 | 2 |
| 19 | 64-128 ms | 2 | 2 |
| 20 | 128-256 ms | 3 | 2 |
| 21 | 256-512 ms | 4 | 2 |
| 22 | 512-1024 ms | 5 | 2 |

Difference logic 450 supports the binary arithmetic operation of subtraction. Based on elapsed time and derived signals 491, 492 generated by weight factor generator 470, difference logic 450 selects an appropriate equation for calculating an updated AQL metric 175. When equation 2 is selected for updating AQL metric 175, difference logic 450 calculates a difference between a previous AQL metric 175 and present IQL metric 170. Alternatively, when equation 3 is selected for updating AQL metric 175, difference logic 450 calculates a difference between a present IQL metric 170 and previous AQL metric 175. The queue length information resides in AQL register 374 and IQL register 372.

Depending on the elapsed time 470 between updates, weight factor generator 470 generates control signal 491 to shift the result in difference logic 450 by an appropriate amount as in Table 1. The net effect of shifting a result stored in difference logic 450 is to apportion an amount of AQL metric 175 and IQL metric 170 to generate a new AQL metric 175.

Finally, to complete updating an AQL metric 175, multiplexor 452 (via signal 492 generated by weight factor generator 470) selects the appropriate value in register AQL register 374 or IQL register 372 to drive summer 454. If equation 3 is selected, then multiplexor 452 selects AQL register 374 to drive summer 454. Conversely, if equation 2 is elected, then multiplexor 452 selects IQL register 372 to drive summer 454.

The value from multiplexor 452 is added to the resulting value stored in difference logic 450. In turn, summer 454 (or adder circuit) produces an updated AQL metric 175 that is stored in AQL register 374 based on equations 2 or 3.

At the time of updating or calculating AQL metric 175, time stamp information 440 is also updated with current time information indicating when AQL metric 175 was updated. Thus, an equation and weight factor w can be selected based on an amount of elapsed time between updates or modifications to queue 120.

Generally, this routine of updating AQL metric 175 is repeated each time the contents of queue 120 is modified. However, it should be noted that metrics can be updated under different circumstances depending on the application. For example, in one application, AQL metric 175 is only updated in response to adding data to a corresponding queue 120.

Figure 5:
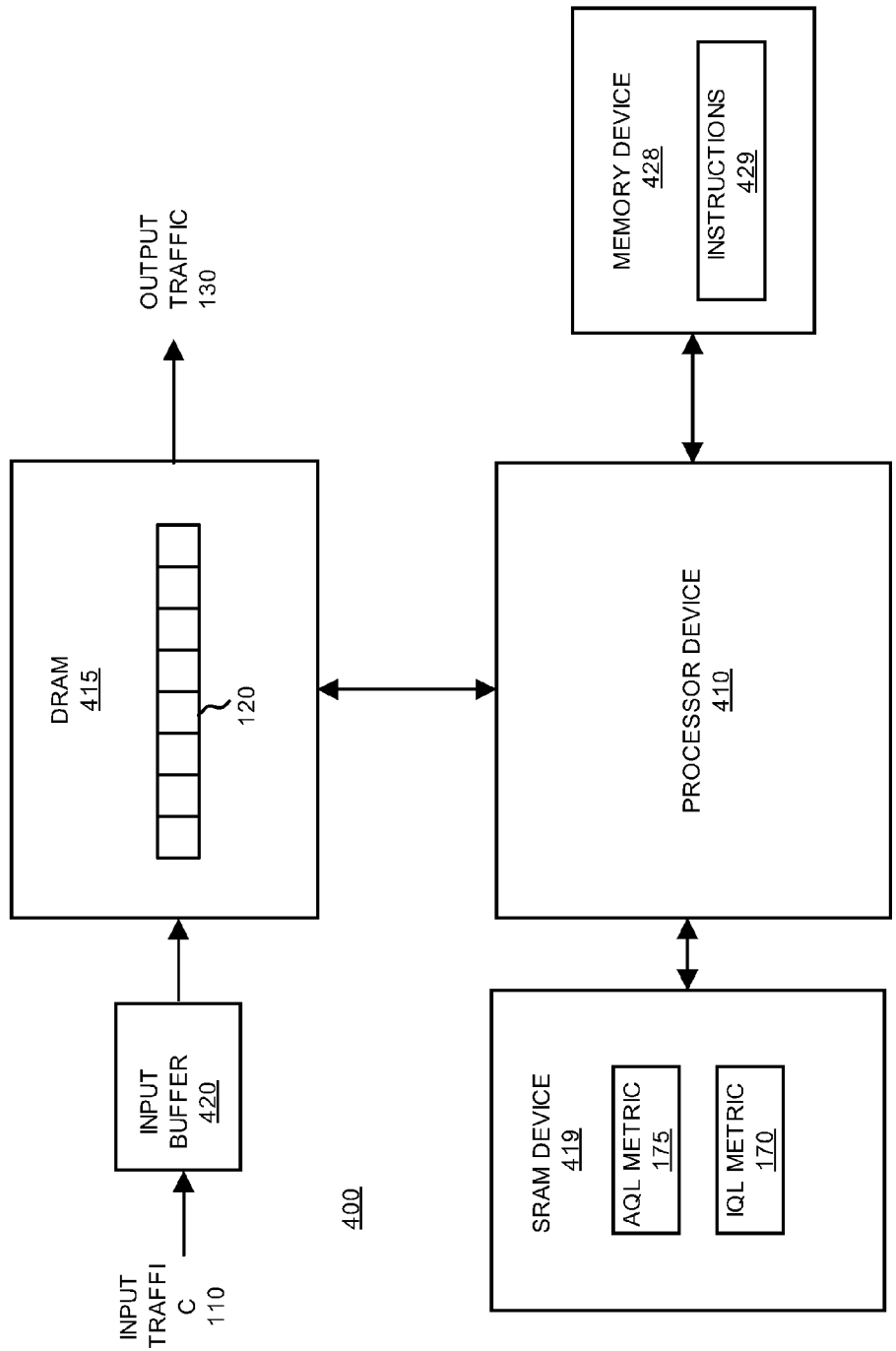
FIG. 5 is a block diagram of a queue and supporting processor circuitry.

FIG. 5 is a block diagram of computer system 400 that updates AQL metric 175. As shown, computer system 400 includes processor device 410 to process data, memory device 428 to store arithmetic instructions 429, input buffer 420 to receive input traffic 110, and DRAM device 415 (Dynamic RAM) and SRAM device 419 (Static RAM) to respectively store information. The functional blocks illustrate a method of updating AQL metric 175 using software.

Upon receipt of input traffic 110 at input buffer 420, processor device 410 determines a present fullness of queue 120. As previously discussed, data stored in input buffer 420 is dropped depending on the fullness of queue 120.

When the contents in queue 120 is modified as a result of either adding or deleting data, processor device 410 executes a program of arithmetic instructions 429 to update AQL metric 175 and IQL metric 170.

Arithmetic instructions 429 enable processor device 410 to achieve the same results as previously discussed using hardware logic. However, computer system 400 illustrates a technique of updating queue length information via a software program (background task). Interrupts or polling software can be used to identify when contents of queue 120 has been modified so the queue length metrics are updated. It should be noted that a combination of hardware and software can be used to update queue length metrics.

Figure 6:
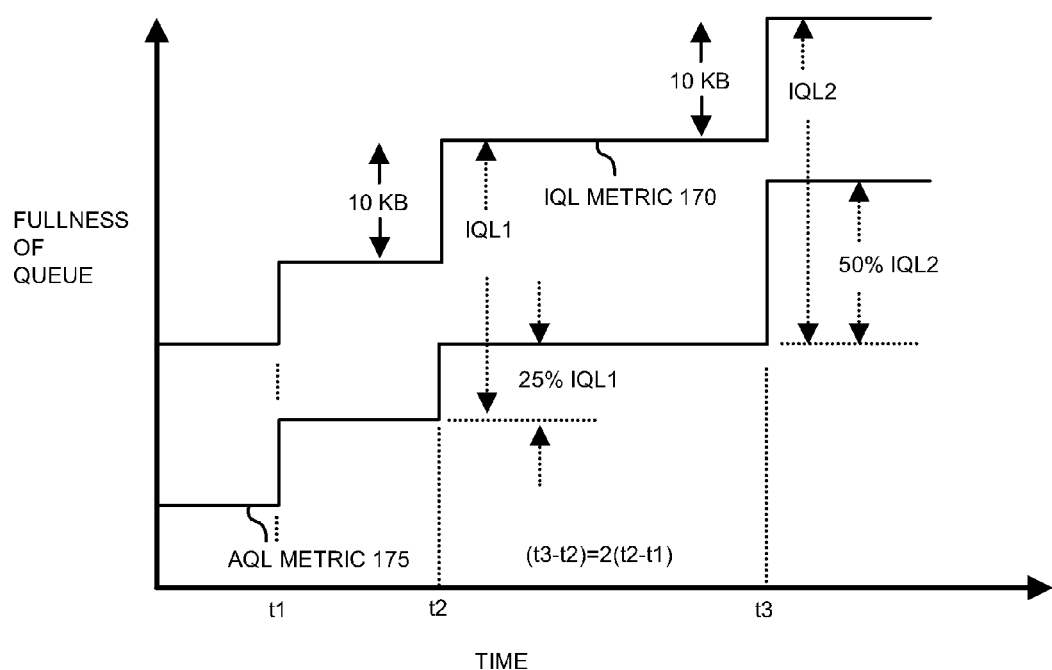
FIG. 6 is a graph illustrating how AQL varies depending on an amount of time elapsed between updates.

FIG. 6 is a graph illustrating how AQL metric 175 tracks IQL metric 170 when data is added to queue 120 at times $t_1$, $t_2$ and $t_3$.

Note that at time $t_2$, when data information is stored in queue 120, IQL metric 170 is updated to reflect an instantaneous length of queue 120. At time $t_2$, 10 kilobytes of data is added to queue 120. In response to adding data to queue 120, queue manager 330 updates AQL metric 175. As shown in FIG. 6, 1 unit of time ($t_2-t_1=1$ unit) has elapsed since a previous update of AQL metric 175. As a result, AQL metric 175 increases by 25% of IQL1 at time $t_2$.

At time $t_3$, another 10 kilobytes of data is added to queue 120. In response to adding this data to queue 120, queue manager 330 updates AQL metric 175. In this case, 2 units of time ($t_3-t_2=2$ units) has elapsed since a previous update of AQL metric 175. In this instance, AQL metric 175 increases by 50% of IQL2 more than its previous value. This illustrates that although queue 120 is filled with a similar amount of data at time $t_2$ and $t_3$, updated AQL metric 175 increases a greater amount at $t_3$ because more time has elapsed since a last AQL update.

Figure 7:
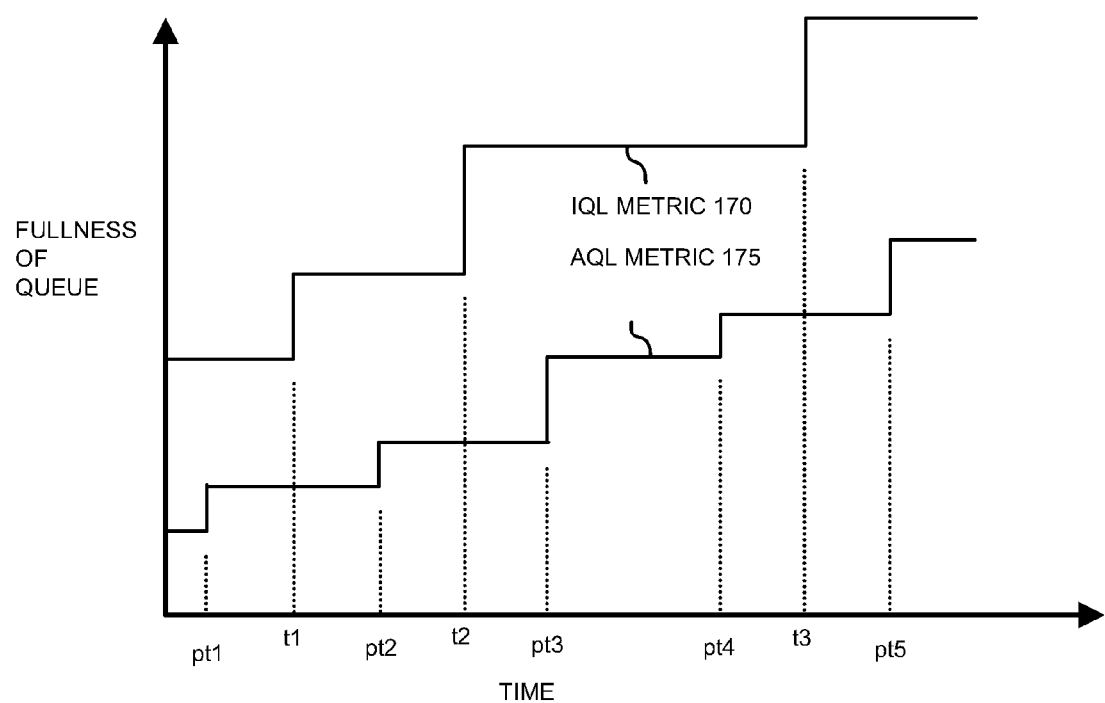
FIG. 7 is a graph comparing a conventional method of periodically updating an AQL metric at equally spaced intervals of time versus updating the IQL metric in response to an the occurrence of an asynchronous event.

FIG. 7 is a graph illustrating a conventional technique for updating AQL metric 175. At sporadic times, $t_1$, $t_2$, and $t_3$, IQL metric 170 is updated in response to adding data to queue 120. Instead of updating AQL metric 175 at the same time of updating IQL metric 170 ($t_1$, $t_2$ and $t_3$), AQL metric 175 is periodically updated at equal time intervals. That is, a time difference t between time $pt_2$ and $pt_1$ is the same as $pt_3$ and $pt_2$, and so on.

Figure 8:
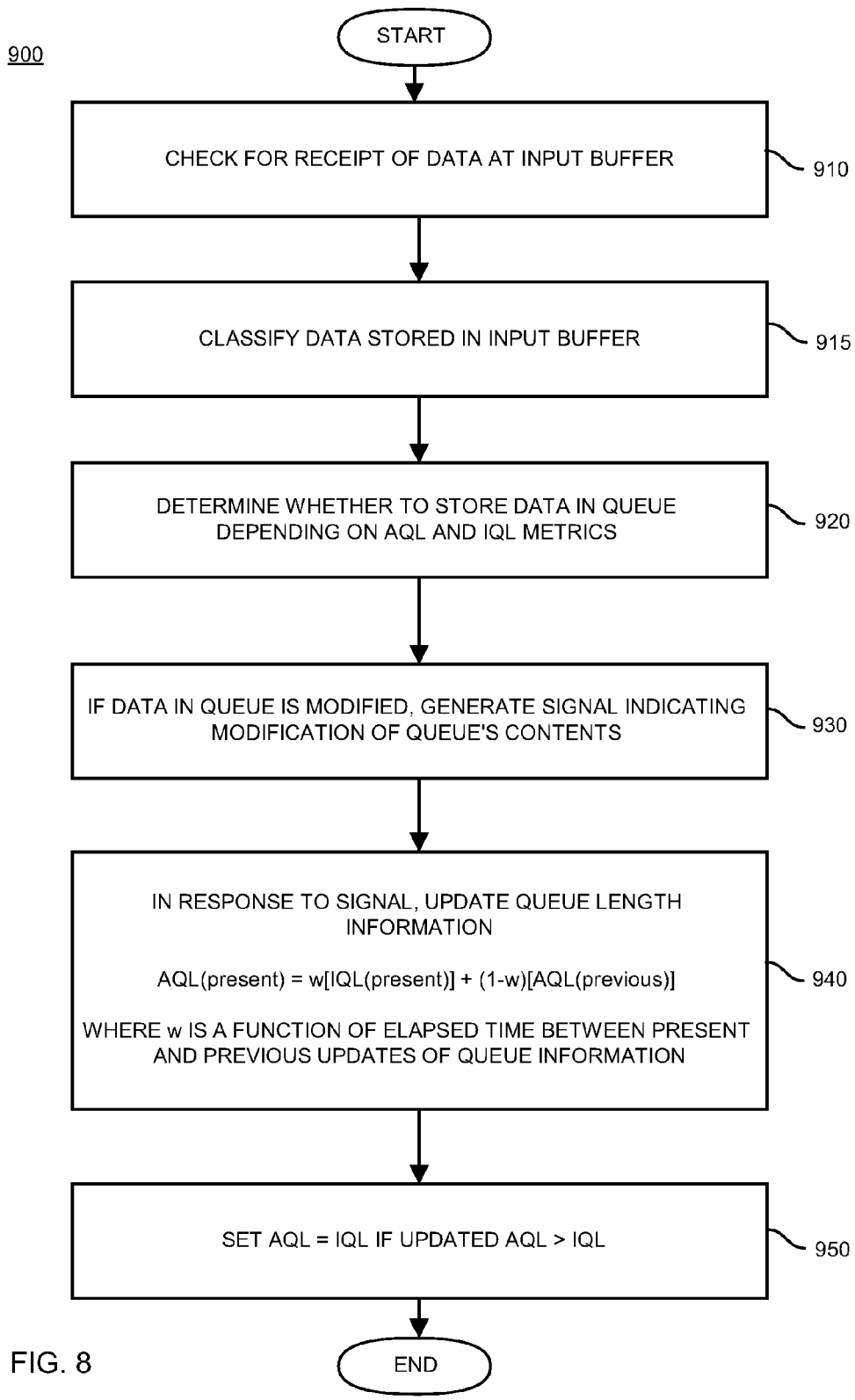
FIG. 8 is a flow chart illustrating a technique for determining whether to store a newly received data packet in a queue based on an AQL metric.

FIG. 8 is a flowchart 900 to maintain queue 120. In step 910, queue manager 330 checks the contents of input buffer 320 for newly received data. Following receipt of new data, flow continues at step 915 where the data is classified. This may involve reading certain fields of the data packet or analyzing a data payload itself. The classification of the data packet is used to determine in which of multiple queues to store the data and a probability chart associated with dropping data.

In step 920, AQL metric 175 and IQL metric 170 are retrieved to determine whether to store the new data packet in queue 120. FIG. 2 is a graph illustrating the probability of whether data will be dropped or stored in queue 120.

In step 930, a signal is generated indicating that new data is stored in queue 120. Such a signal is also generated if data is deleted from queue 120.

In step 940, queue length information stored in logic device 370 is updated in response to receiving the signal indicating modification of queue 120. More specifically, IQL metric 170 and AQL metric 175 are updated according to equation 1 as discussed.

In step 950, AQL metric 175 is set to IQL metric 170 if AQL metric 175 is more than IQL metric 170. This technique of tracking AQL metric 175 ensures that queue 120 more readily accepts new data for storage if memory space is actually available.

Figure 9:
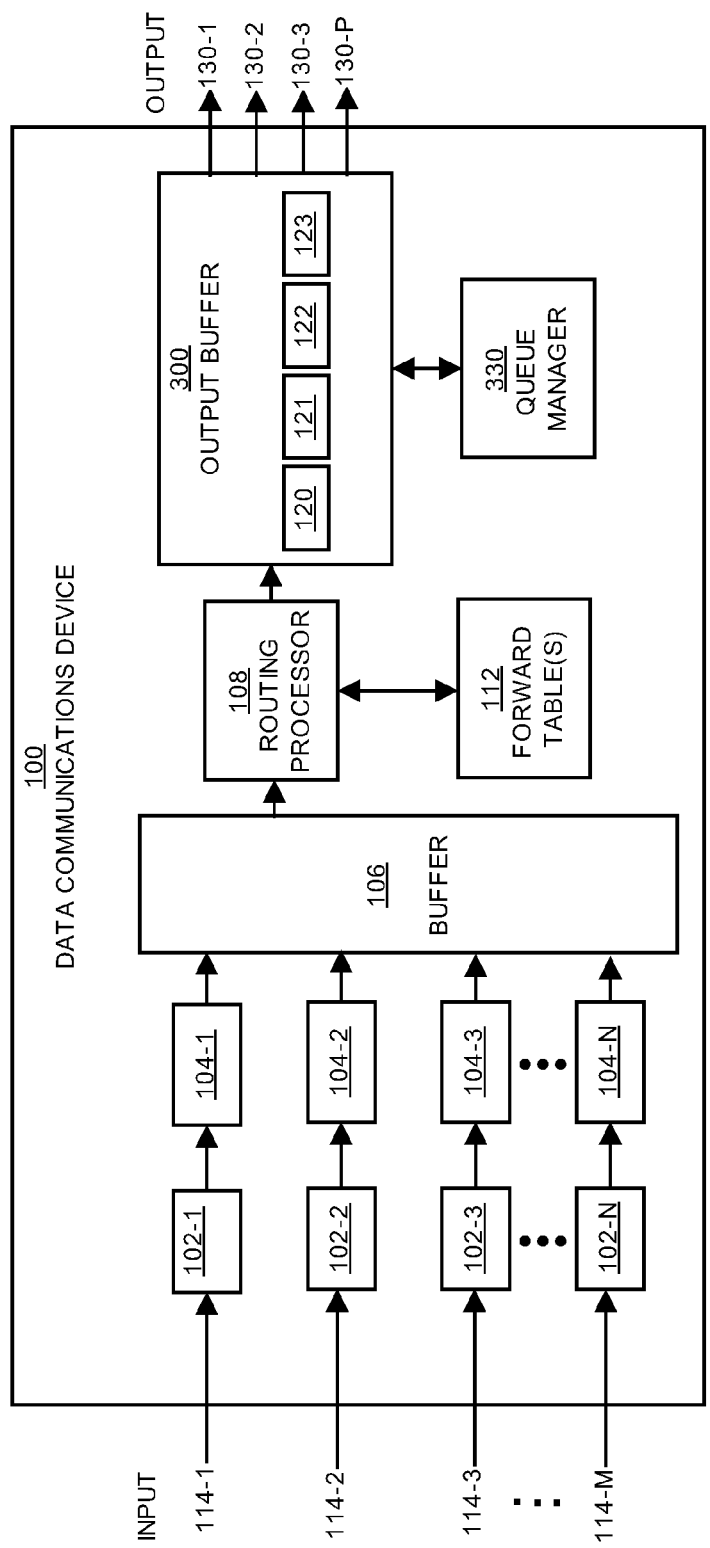
FIG. 9 is a block diagram of a data communications device employing use of multiple data queues.

As previously discussed, output buffer 300 is used to monitor and maintain queue 120. The technique of maintaining queue 120 can be used in a data communications device such as a router disposed at a node of a network. In such an application, the queues provide temporary storage of data packets that are to be routed to a following network node. FIG. 9 is a block diagram of data communications device 100 including buffer 300 according to certain principles of the present invention. Buffer 300 includes functionality to manage queues 120, 121, 122, and 123.

As shown, communications device 100 includes converters 102, processors/framers 104, buffer 106, routing processor 108, forward tables 110, buffer 300, and queue manager 330.

In the context of data communications device 300, data information such as TCP/IP (Transmission Control Protocol/Internet Protocol) packets are received on inputs 114-1, 114-2, . . . , 114-*m*. Typically, inputs 114 are hardwired electronic cables or optical fibers of a communication network.

The data information received at inputs 114 is converted via corresponding converter 102 into digitally encoded binary information. Framer circuits 104 process the incoming data. Based on a type of received information, framers 104 classify packets and store them in buffer 106. Routing processor 108 utilizes forward tables 112 to repackage the data packets stored in buffer 106 for appropriate transmission to an intended downstream target.

In accordance with the techniques as previously discussed, data packets (input traffic 110) are temporarily stored in potentially one of tens of thousands of queues for later transmission on outputs 130-1, 130-2, . . . , 130-*p*.

The aforementioned techniques for tracking queue length information in data communications device 100 is beneficial over the use of conventional techniques. Consider that management of a single queue requires a certain amount of resources. In applications in which thousands of queues are managed, proportionally more resources such as memory bandwidth are required to track metrics associated with the queues. According to one aspect of the present invention, memory bandwidth is conserved because the AQL and IQL metrics are updated at the same time. Thus, resources and management bandwidth previously employed to manage queue length information for one or multiple queues can instead be used for other purposes such as actual transmission or transfer of the data so that a communications device supports a higher throughput.

What is claimed is:

1. In a data communications device including a queue, a method of tracking queue length information comprising:
   receiving a signal indicating a change in an amount of data stored in the queue; and
   in response to receiving the signal:
      updating an instantaneous queue length metric (IQL) associated with the queue, the instantaneous queue length metric identifying a length of the queue at a particular instant in time; and
      updating an average queue length metric (AQL) associated with the queue to track a relative fullness of the queue over time;
      wherein the step of updating the average queue length metric includes:
         updating the average queue length metric depending on an amount of elapsed time since a previous update of the average queue length metric.

2. A method as in claim 1, further comprising:
   comparing the average queue length metric to a threshold to determine whether or not to store a newly received data packet in the queue for later transmission.

3. A method as in claim 1, wherein the step of updating the average queue length metric is performed in response to storage of additional data information in the queue.

4. In a data communications device including a queue, a method of tracking queue length information comprising:
   receiving a signal indicating a change in an amount of data stored in the queue; and
   in response to receiving the signal:
      updating an instantaneous queue length metric (IQL) associated with the queue, the instantaneous queue length metric identifying a length of the queue at a particular instant in time;
      updating an average queue length metric (AQL) associated with the queue to track a relative fullness of the queue over time;
      comparing the updated instantaneous queue length metric to the average queue length metric; and
      if the instantaneous queue length metric is smaller than a newly calculated average queue length metric, setting the present average queue length metric equal to the instantaneous queue length metric.

5. In a data communications device including a queue, a method of tracking queue length information comprising:
   receiving a signal indicating a change in an amount of data stored in the queue; and
   in response to receiving the signal:
      updating an instantaneous queue length metric (IQL) associated with the queue, the instantaneous queue length metric identifying a length of the queue at a particular instant in time; and
      updating an average queue length metric (AQL) associated with the queue to track a relative fullness of the queue over time;
      wherein the step of updating the average queue length metric includes:
         identifying an amount of elapsed time since a previous update of the average queue length metric;
         based on the amount of elapsed time, generating a weight factor; and
         producing the updated average queue length metric associated with the queue, based at least in part, by multiplying the weight factor by a difference of a present instantaneous queue length metric and previous average queue length metric.

6. A method as in claim 1 further comprising:
   generating time stamp information associated with an update of the average queue length, the time stamp information indicating a relative time of updating the average queue length metric.

7. In a data communications device including a queue, a method of tracking queue length information comprising:
   receiving a signal indicating a change in an amount of data stored in the queue; and
   in response to receiving the signal:
      updating an instantaneous queue length metric (IQL) associated with the queue, the instantaneous queue length metric identifying a length of the queue at a particular instant in time; and
      updating an average queue length metric (AQL) associated with the queue to track a relative fullness of the queue over time;
      wherein the step of updating the average queue length metric (AQL) includes calculating AQL using the following equation:
         updated AQL=previous AQL+w(present IQL−previous AQL), where w is a weight factor that varies depending on an amount of elapsed time since a previous AQL update.

8. A method as in claim 7, wherein the weight factor, w, is a value between 0 and 1.

9. A method as in claim 8, wherein w is proportionally larger for longer amounts of elapsed time since a previous AQL update.

10. In a data communications device including at least one queue, a system for tracking queue length information comprising:
    a queue that is used to store data information queued for later transmission to a downstream communications device;
    a memory device that stores an instantaneous queue length metric indicating actual fullness of the queue at a particular instant in time, the memory device also storing a running-average queue length metric to track an historical fullness of the queue over time; and
    a processing device that updates the running-average queue length metric stored in the memory device in response to a modification of contents stored in the queue;
    wherein the running-average queue length metric stored in the memory device is updated depending on an amount of elapsed time since a previous update of the running average queue length.

11. A system as in claim 10, wherein the instantaneous queue length metric and running-average queue length metric stored in the memory device are updated at substantially the same time in response to the modification of contents stored in the queue.

12. In a data communications device including at least one queue, a system for tracking queue length information comprising:

a queue that is used to store data information queued for later transmission to a downstream communications device;

a memory device that stores an instantaneous queue length metric (IQL) indicating actual fullness of the queue at a particular instant in time, the memory device also storing a running-average queue length metric to track an historical fullness of the queue over time; and a processing device that updates the running-average queue length metric stored in the memory device in response to a modification of contents stored in the queue;

wherein the running-average queue length metric (AQL) is updated to a new value using the following equation:

$$\text{updated AQL} = w(\text{present IQL}) + (1-w)(\text{previous AQL}),$$

where w is a weight factor that varies depending on an elapsed time since a previous AQL update.

13. A system as in claim 12, wherein w is a value between 0 and 1.

14. A system as in claim 13, wherein w is proportionally larger for longer elapsed time since a previous AQL update.

15. A system as in claim 10, wherein the running-average queue length metric stored in the memory device is updated in response to deleting data from the queue.

16. A system as in claim 10, wherein time stamp information is stored in the memory device indicating a time of updating the running-average queue length metric.

17. A system as in claim 16, wherein the processing device retrieves the time stamp information associated with previously updated queue length information to calculate a newly updated running-average queue length metric.

18. A system as in claim 17, wherein calculation of the newly updated running-average queue is based, at least in part, on the time since a last updating of the running-average queue length metric.

19. A method as in claim 7 wherein calculating AQL includes using the following equation when the elapsed time since a previous AQL update exceeds a threshold value:

$$\text{updated AQL} = \text{present IQL} + w(\text{previous AQL} - \text{present IQL});$$

and by using the following equation when the elapsed time since a previous AQL update does not exceed the threshold value:

$$\text{updated AQL} = \text{previous AQL} + w(\text{present IQL} - \text{previous AQL}).$$

20. A method as in claim 19 wherein the threshold value is at least 32 milliseconds.

21. A system as in claim 12 wherein the provided equation is calculated by using the following equation when the elapsed time since a previous AQL update exceeds a threshold value:

$$\text{updated AQL} = \text{present IQL} + w(\text{previous AQL} - \text{present IQL})$$

and by using the following equation when the elapsed time since a previous AQL update does not exceed the threshold value:

$$\text{updated AQL} = \text{previous AQL} + w(\text{present IQL} - \text{previous AQL}).$$

22. A system as in claim 21 wherein the threshold value is at least 32 milliseconds.

\* \* \* \* \*